Oct. 19, 1965 P. S. YOUNG 3,212,584
DAMPER AND POSITIONER
Filed May 28, 1964 3 Sheets-Sheet 1

INVENTOR
PETER S. YOUNG.
BY Jack N. McCarthy
AGENT

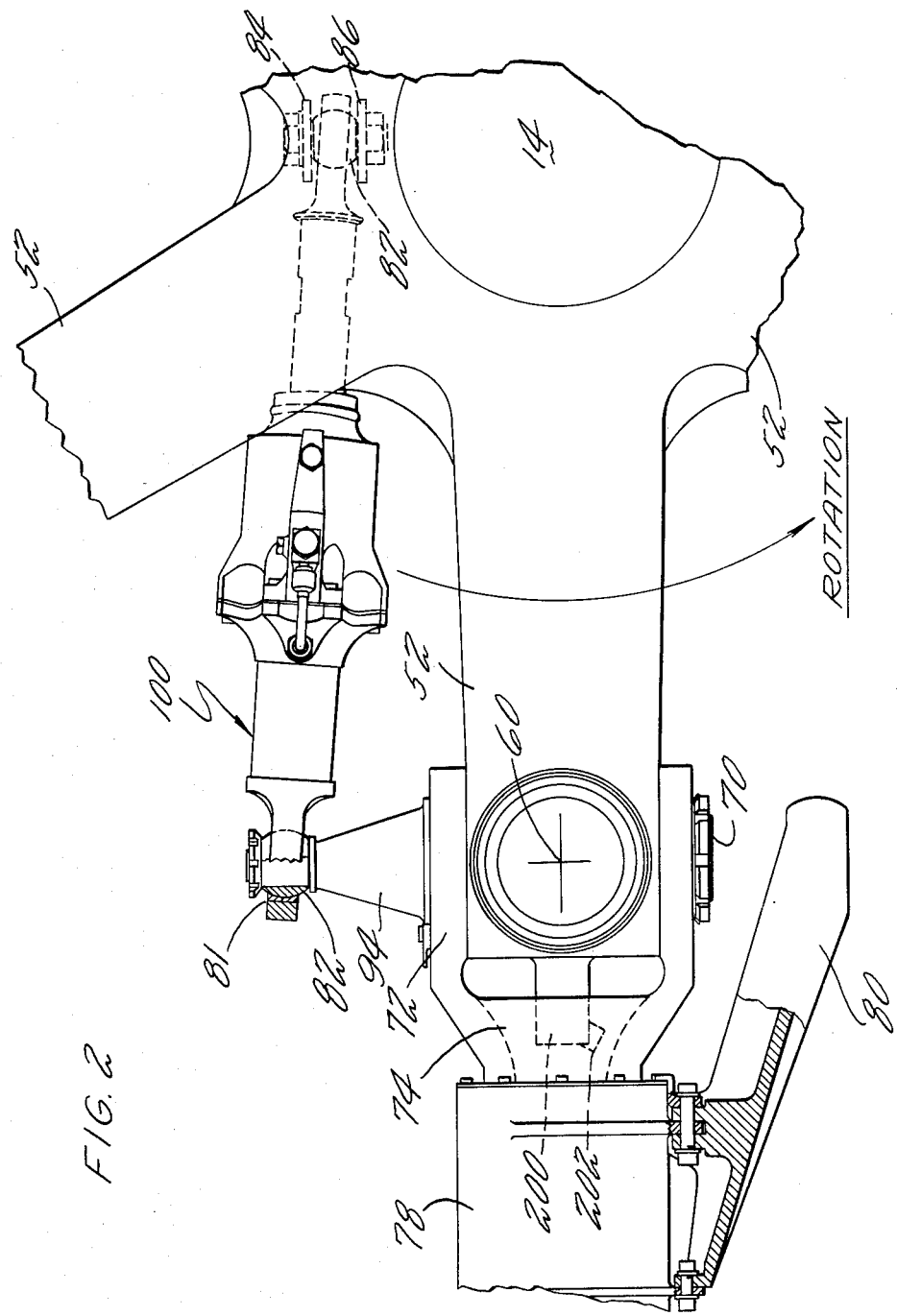

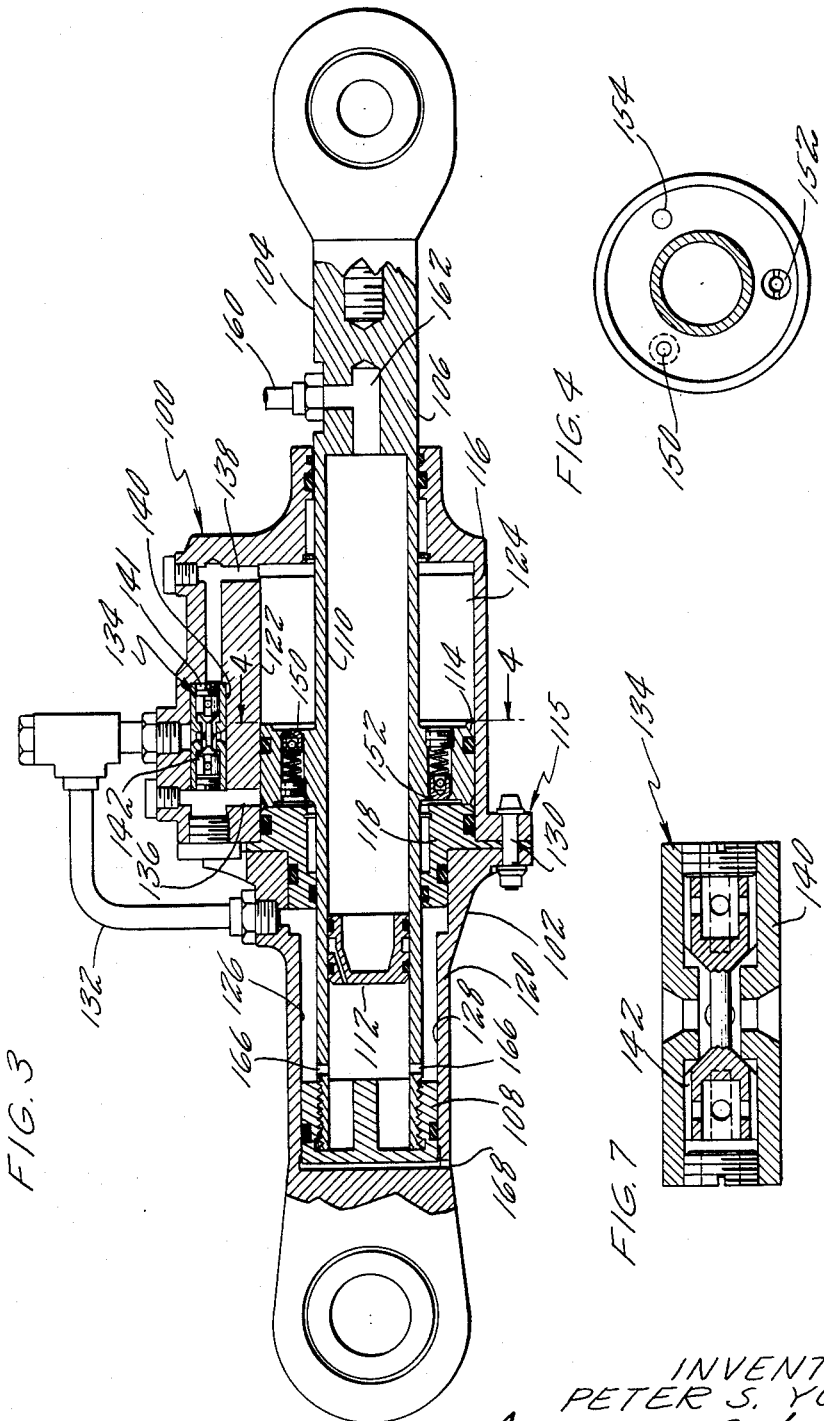

United States Patent Office 3,212,584
Patented Oct. 19, 1965

3,212,584
DAMPER AND POSITIONER
Peter S. Young, Bridgeport, Conn., assignor to United
Aircraft Corporation, East Hartford, Conn., a corporation of Delaware
Filed May 28, 1964, Ser. No. 371,059
17 Claims. (Cl. 170—160.55)

This invention relates to means for damping movement between two members and also providing for positioning them, and more particularly for use between the blades and rotor head of a helicopter.

An object of this invention is to provide a device which will provide a damping action between two members and also act as means for positioning the two members.

Another object of this invention is to provide a damper and actuator unit having a self-contained accumulator.

A further object of this invention is to provide a unit which will automatically position the blades to predetermined locations when the rotor has ceased to rotate or has reduced its speed of rotation below a predetermined value.

Another object of this invention is to provide a damper having improved damping characteristics where cavitation on the retreating side of a moving piston will be lessened.

A further object of this invention is to provide a self-contained reservoir in the damper and actuator unit. This reservoir will provide for normal operating fluid losses in the unit.

Other objects and advantages will be apparent from a reading of the following specification.

In the drawings:

FIGURE 2 is an enlarged fragmentary view of the rotor head showing the blade damper and positioner located between the head and the blade.

FIGURE 3 is an enlarged sectional view of the damper and positioner unit.

FIGURE 4 is a view taken along the line 4—4 of FIG. 3.

FIGURE 7 is an enlarged view of a valve used in the damper and positioner unit.

Figure 1:
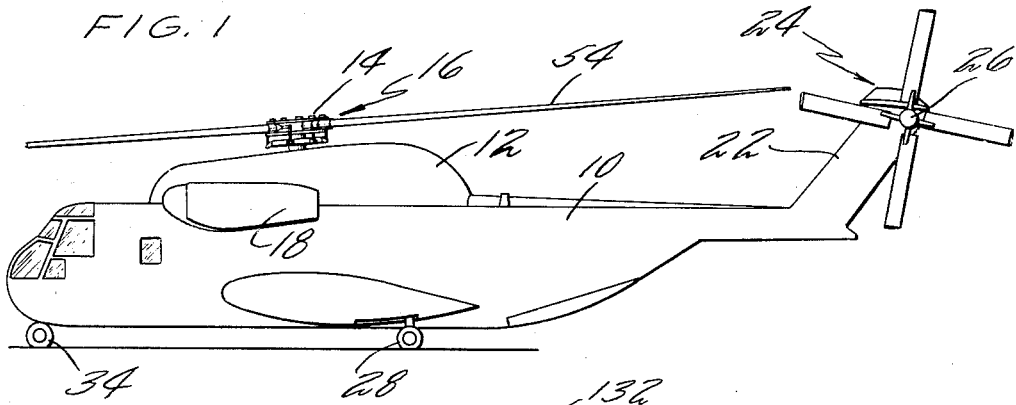
FIGURE 1 is a side elevational view of a helicopter of a single main rotor type embodying the invention.
Figure 5:
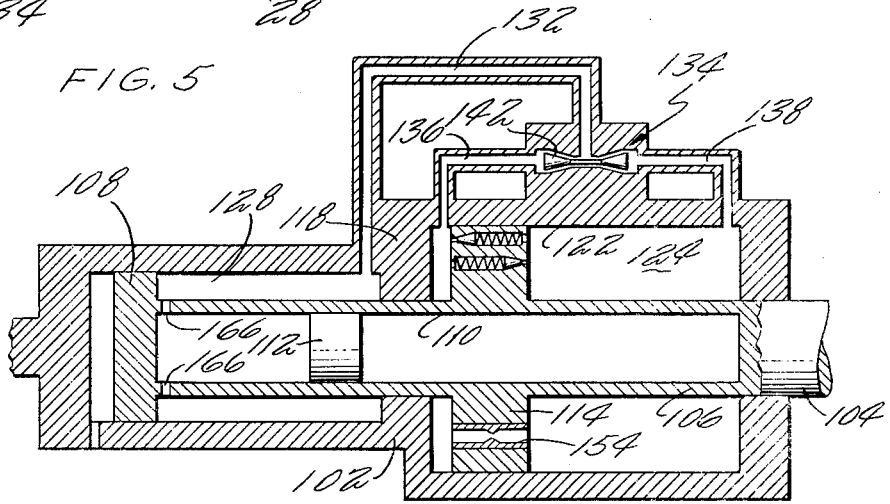
FIGURE 5 is a schematic view of the blade damper and positioner shown in FIG. 3.

Referring to FIG. 1, the helicopter embodying the invention comprises an essentially elongated fuselage 10 having a main rotor pylon 12 and a tail rotor pylon 22 on which are mounted the main rotor generally indicated at 16 and a tail rotor generally indicated at 24. The main rotor 16 comprises a rotor head 14 having rotor blades 54 mounted thereon for pitch changing movement, flapping, and lag-lead movement. A rotor head of this type is shown in U.S. Patent No. 2,638,994, and a control system for this helicopter could have any operable design such as, for example, that shown in U.S. application Serial No. 171,331.

In the helicopter structure shown, a jet engine 18 is located on each side of the main rotor pylon 12 adjacent the upper part of the fuselage 10. These two engines provide the power plant section and drive a main transmission. This main transmission turns the main rotor and the shaft for turning the tail rotor. The helicopter is supported on the ground by conventional landing gear 34, 28.

In FIG. 2, one arm 52 is shown extending from the rotor head 14. This arm 52 has a corresponding lower arm which is positioned directly below it. A drag hinge 60 is provided between the free ends of each pair of arms 52 and a flapping link 74 is positioned having forked ends pivotally mounted to the drag hinge. Each blade has a blade attaching sleeve 78 fixed thereto at its root end which is mounted for rotation on a hollow spindle which extends outwardly from the flapping link 74. A blade pitch changing horn 80 extends from each of the blade attaching sleeves 78. The free end of each blade pitch changing horn is attached to a control lever for effecting blade pitch change. A specific blade attachment structure is shown in U.S. Patent No. 2,744,553.

From each of the flapping links 74 a lateral extension 94 projects along the flapping axis. The damper and positioner unit 100 is connected between the free end of this extension 94 and a bracket is fixed between the upper and lower plates of the rotor containing the arms 52.

Each attaching end of the damper and positioner 100 is formed having a ball seat 81 for engagement with a ball 82. Each of the extensions 94 has a ball 82 fixed to the end thereof and each of the rotor head connections includes a ball 82 fixed between bracket members 84 and 86. These brackets are fixed in relation to the rotor head and provide means on which a ball can be mounted.

The damper and positioner unit 100 is made up of two main parts, (1) a cylinder unit 102 and (2) a piston unit 104. The piston unit 104 is formed having a rod 106 which includes a piston 108 on one end and an attaching device on the other end. This has been previously described as a ball seat for engagement with a ball. The rod 106 is formed having a cylindrical bore 110 extending from a point adjacent the piston 108 to a point adjacent the free end of the rod. A piston 112 is mounted in said cylindrical bore 110 for free reciprocal movement for a purpose to be hereinafter described. A piston 114 is located on said rod 106 at a point intermediate its ends.

The cylinder unit 102 is formed having a housing 115 which is in turn made up from three members 116, 118 and 120. Member 116 is formed having a cylindrical bore 122 for slideably receiving piston 114 of the piston unit 104. While one end is open the other end is closed by member 116 where it extends inwardly toward the rod 106 and engages it providing a seal therewith while providing reciprocation therebetween. This portion of the member 116 engages the rod 106 between the piston 114 and its free end having the attaching device.

The member 118 of the housing 115 is fixed to the end of the member 116 to provide another end for the cylindrical bore 122 thereby forming a chamber 124. Member 120 has a cylindrical bore 126 therein and while one end is open, the other end is fixedly closed off by a solid end which is formed having an attaching device. This attaching device is similar to that on the rod 106.

The cylindrical bore 126 is formed so that the piston 108 can be slideably positioned within the bore and permitted reciprocal movement. The end of the cylindrical bore 126 adjacent the attaching device is connected to the exterior of housing 120 by an opening 168. The open end of the member 120 is fixed to the member 118. This provides a chamber 128. The members 116, 118 and 120 of the housing 115 are fixed together by means of bolts 130 which are located around the housing.

Chamber 128 is connected at its end adjacent member 118 by a conduit 132 to a valve mechanism 134. Each end of chamber 124 is also connected to this valve mechanism 134. A conduit 136 connects the end of chamber 124 adjacent member 118 to the valve mechanism and conduit 138 connects the other end of chamber 124 to the valve mechanism.

This valve mechanism allows flow between conduits 132 and either of passages 136 and 138 but it will never permit flow from conduit 136 to conduit 138 or from conduit 138 to conduit 136. This valve mechanism is shown constructed having a cylindrical member 140 fixed within the member 116 with a movable valve portion 142 therein. The cylindrical member 140 has a recessed cylindrical bore extending inwardly from each end for around a third of its length with a smaller cylindrical passageway connecting the ends of the recesses. Openings in the member 140 connect the center passageway with an outer annulus. This annulus in turn connects with the end of conduit 132. The movable valve portion within the valve mechanism comprises two cylindrical members each having corrugated sides and being slideably mounted one in each of the cylindrical recesses and a stem which connects them. The longitudinal passages formed by the corrugations connect the smaller cylindrical passageway with either conduit 136 or conduit 138 when the movable valve portion 142 is positioned in one direction or the other. Threaded annular members 141 are threaded into the end of each recessed cylindrical bore to prevent the movable valve portion 142 from being removed from the member 140 inadvertently.

The piston 114 has located therethrough from one face to the other a passageway having a one way check valve 150, a second passageway having a one way check valve 152, and a restricted passageway 154. As the cylinder unit and piston unit move longitudinally with respect to each other, damping is obtained by having the fluid displaced from the chamber 124 on one side of piston 114 through the orifice 154 to the other side of the piston 114. If either the frequency of movement or amplitude of vibration causes the fluid pressure to exceed a maximum limit, fluid can also pass through a check valve. The check valves are arranged to permit flow in opposite directions. The restricted passageway 154 can have its restriction so chosen so as to provide the desired damping effect in operation.

The end of rod 106 which projects out of the housing of the cylinder unit 102 is formed having a passageway 162 extending from the end of the cylindrical bore 110 to an air-charging valve 160 located externally of the rod. The other end of the cylindrical bore 110 is connected to the chamber 120 by openings 166.

Figure 6:
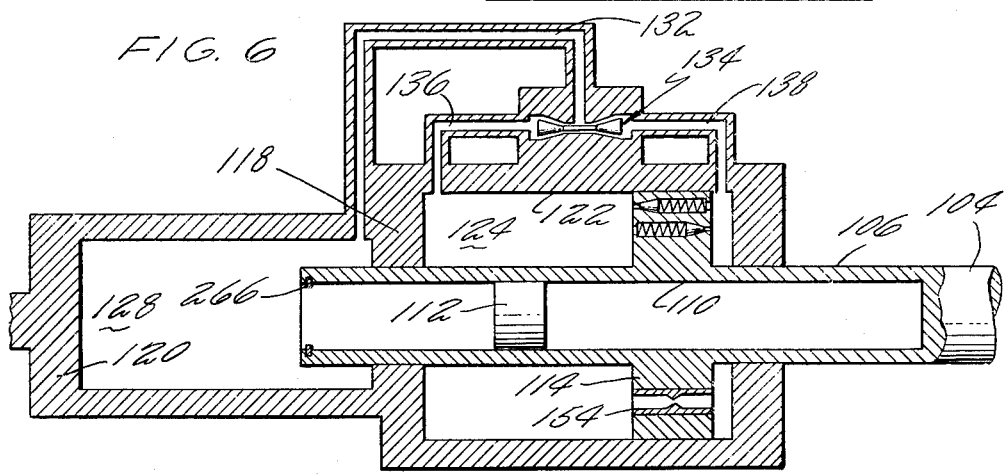
FIGURE 6 is a schematic view of a blade damper and positioner which will actuate a blade in the opposite direction.

FIGURE 6 shows the blade damper and positioner arranged so that the compressed gas in the cylindrical bore 110, to the right of piston 112, will raise the fluid on the other side of piston 112 in the cylindrical bore 110 and in the chamber 128 to the same pressure where it will act between the fixed end of member 120 and the annular end of piston rod 106 and left side of piston 112 (these parts acting as a piston member). An increase of pressure in chamber 128 will cause the piston unit to move to the right and thereby increase the length of the unit. The piston unit 104 will move to the right until it hits a stop. Here as before, any type of desirable stop can be used to locate the length of the unit at some desired length. A snap ring 266 is located in the left end of the bore 110 to retain the piston 112 within the cylindrical bore 110 at all times.

*Operation*

In FIG. 3, the damper and positioner unit is shown in its "at rest" position in which it is at its shortest length. With the cylindrical bore 110, to the right of piston 112, pressurized to a predetermined value it can be seen that the fluid on the other side of the piston 112 in the cylindrical bore 110 would be raised to the same pressure and that it will pass through openings 166 into the chamber 128 where it will act between the fixed member 118 and the cooperating surface of piston 108. This, of course, will move piston 108 to the left until it hits a stop. In FIG. 3, the piston 114 is shown as contacting member 118. Any type of desirable stop can be used to locate the length of the unit at some desired length. When the unit is installed between a rotor head and a blade (as shown in FIG. 2 with rotation as indicated thereon) as the rotor increases its speed up to its operating speed, the centrifugal force on the blades will tend to place them in a more radial position and this will, of course, extend the length of each of the units and place the piston 114 somewhere within the mating cylindrical bore 122 where damping can take effect with the fluid being forced through the restricted passageway 154. In the damping action, it can be seen that when piston 114 is moved rapidly to the right the pressure will build up in conduit 138 and, therefore, move the movable valve portion 142 of the valve mechanism 134 so that the end of passageway 138 is closed off but conduit 136 is open to conduit 132. This will allow the pressurized fluid in chamber 128 to pass through conduit 132, valve mechanism 134, and conduit 136 into the chamber 124 on the left, or retreating side at this time, of the piston 114. This will prevent cavitation which will improve the damping characteristics of the unit.

When the piston moves to the left, the pressure in conduit 136 will be increased and the movable valve portion 142 of the valve mechanism 134 will move to the right closing the end of conduit 136 and connecting conduit 138 with conduit 132. It can be seen now that the pressurized fluid in chamber 128 will be connected through conduit 132, valve mechanism 134, and conduit 138 to the chamber 124 on the right side, and now retreating side, of the piston 114. This will have the same effect at this time, that is reducing cavitation, as it did before.

While the helicopter is operating, the force of the blade on the end of the unit attached to the blade provides the actuating force on the unit. However, when the rotor is slowed to some predetermined speed, or stop, the air pressure in the right end of the cylindrical bore 110, between the piston 112 and the end of the unit attached to the rotor head, tends to move the piston 112 to the left and force the fluid through the openings 166 and into the chamber 128 to shorten the length of the unit until it abuts a stop. While a stop can be within the unit, a fixed lead-lag stop could be provided between a rotor head and cooperating blade. For example, in FIG. 2, a projection 200 could extend into the interior of the hollow flapping link and an abutment 202 could be fixed thereon of a desired length so that it would abut the side of the flapping link at a desired time to position a blade at a specific location.

It is to be understood that the invention is not limited to the specific description above or other specific figures, but may be used in other ways without departure from its spirit as defined by the following claims.

I claim:

1. In a helicopter; a rotor head; a plurality of blades attached thereto and being permitted limited movement in a lead-lag direction; and means connecting each blade to said rotor to damp movements of each blade independently of each other in said lead-lag direction when said rotor is operating at its flight speed and for positioning each blade at a predetermined position with respect to said rotor when said rotor is below a predetermined speed.

2. In a helicopter; a rotor head; a plurality of blades attached thereto and being permitted limited movement in a lead-lag direction; and means connecting each blade to said rotor to damp movements of each blade independently of each other in said lead-lag direction when said rotor is operating at its flight speed and for positioning each blade at a predetermined position with respect to said rotor when said rotor is below a predetermined speed; said connecting means including a cooperating cylinder and piston providing a damping action, an accumulator, valved means located externally of said cylinder connecting said accumulator to said cylinder to maintain operating fluid in said cylinder, positioning means for biasing said cooperating cylinder and piston into a predetermined position.

3. In a helicopter; a rotor head; a plurality of blades attached thereto and being permitted limited movement in a lead-lag direction, and means connecting each blade to said rotor to damp movements of each blade independently of each other in said lead-lag direction when said rotor is operating at its flight speed and for positioning each blade at a predetermined position with respect to said rotor when said rotor is below a predetermined speed; said connecting means including a cooperating first cylinder and first piston providing a damping action, a cooperating second cylinder and second piston providing a positioning action, said first and second cylinders being fixed relative to each other, said first piston and second piston being spaced by a piston rod extending between the two cylinders.

4. In a helicopter; a rotor head; a plurality of blades attached thereto and being permitted limited movement in a lead-lag direction; and means connecting each blade to said rotor to damp movements of each blade independently of each other in said lead-lag direction when said rotor is operating at its flight speed and for positioning each blade at a predetermined position with respect to said rotor when said rotor is below a predetermined speed; said connecting means including a cooperating first cylinder and first piston providing a damping action, a cooperating second cylinder and second piston providing a positioning action, an accumulator, valved means located externally of said first and second cylinders connecting said accumulator to said first cylinder to maintain operating fluid in said first cylinder.

5. In a helicopter; a rotor head; a plurality of blades attached thereto and being permitted limited movement in a lead-lag direction; and means connecting each blade to said rotor to damp movements of each blade in said lead-lag direction when said rotor is operating at its flight speed and for positioning each blade when said rotor is below a predetermined speed; said connecting means including a cooperating cylinder and piston providing a damping action, a cooperating second cylinder and second piston providing a positioning action, a piston rod fixedly mounting said first and second pistons, an accumulator, valved means connecting said accumulator to said first cylinder to maintain operating fluid in said first cylinder.

6. In a helicopter; a rotor head; a plurality of blades attached thereto and being permitted limited movement in a lead-lag direction; and means connecting each blade to said rotor to damp movements of each blade in said lead-lag direction when said rotor is operating at its flight speed and for positioning each blade when said rotor is below a predetermined speed; said connecting means including a cooperating cylinder and piston providing a damping action, a cooperating second cylinder and second piston providing a positioning action, a piston rod fixedly mounting said first and second pistons, said piston rod being hollow, a piston mounted in said hollow rod for reciprocable movement, said hollow rod being connected to said second cylinder, valved means connecting said second cylinder to said first cylinder to maintain operating fluid in said first cylinder.

7. A damping device for damping motion between two points including:
   (a) a cylinder unit,
   (b) a piston unit mounted for reciprocation therewith,
   (c) said piston unit comprising:
      (1) a piston rod,
      (2) said piston rod being hollow,
      (3) a pressurized fluid in said hollow piston rod,
      (4) a first piston being mounted intermediate the ends of said rod,
      (5) a second piston being mounted at one end of said rod,
      (6) attaching means being mounted at the other end of said rod,
   (d) said cylinder unit having:
      (1) a first chamber therein,
      (2) a second chamber therein,
      (3) attaching means,
   (e) said first piston being mounted for reciprocation in said first chamber,
   (f) said second piston being mounted for reciprocation in said second chamber,
   (g) the attaching means of said rod extending externally of said cylinder unit,
   (h) an opening connecting the interior of said hollow rod with said first chamber between said first and second pistons,
   (i) valved means connecting said first chamber with said second chamber,
      (1) said valved means including a valve which will direct fluid from said first chamber to one side or the other side of said second piston in said second chamber,
      (2) said valve preventing flow of fluid from either side of said second piston to the other.

8. A damping device for damping motion between two points including:
   (a) a cylinder unit,
   (b) a piston unit mounted for reciprocation therewith,
   (c) said piston unit comprising:
      (1) a piston rod,
      (2) said piston rod being hollow,
      (3) a first piston being mounted intermediate the ends of said rod,
      (4) a second piston being mounted at one end of said rod,
      (5) attaching means being mounted at the other end of said rod,
      (6) a third piston being freely mounted in said hollow piston rod for reciprocation,
      (7) a pressurized fluid in said hollow piston rod on one side of the third piston,
      (8) a pressurized gas in said hollow piston rod on the other side of the third piston,
   (d) said cylinder unit having:
      (1) a first chamber therein,
      (2) a second chamber therein,
      (3) attaching means,
   (e) said first piston being mounted for reciprocation in said first chamber,
   (f) said second piston being mounted for reciprocation in said second chamber,
   (g) the attaching means of said rod extending externally of said cylinder unit,
   (h) an opening connecting the interior of said hollow rod with said first chamber between said first and second pistons,
   (i) valved means connecting said first chamber with said second chamber,
      (1) said valved means including a valve which will direct fluid from said first chamber to one side or the other side of said second piston in said second chamber,
      (2) said valve preventing flow of fluid from either side of said second piston to the other.

9. A damping device for damping motion between two points including:
   (a) a cylinder unit,
   (b) a piston unit mounted for reciprocation therewith,
   (c) said piston unit comprising:
      (1) a piston rod,
      (2) said piston rod being hollow,
      (3) a first piston being mounted intermediate the ends of said rod,
      (4) a second piston being mounted at one end of said rod,
      (5) attaching means being mounted at the other end of said rod,
      (6) a third piston being freely mounted in said hollow piston rod for reciprocation,
      (7) a pressurized fluid in said hollow piston rod on one side of the third piston, (8) a pressurized gas in said hollow piston rod on the other side of the third piston,
(d) said cylinder unit having:
 (1) a first chamber therein,
 (2) a second chamber therein,
 (3) attaching means,
(e) said first piston being mounted for reciprocation in said first chamber,
(f) said second piston being mounted for reciprocation in said second chamber,
(g) the attaching means of said rod extending externally of said cylinder unit,
(h) an opening connecting the interior of said hollow rod with said first chamber between said first and second pistons,
(i) valved means connecting said first chamber with said second chamber,
 (1) said valved means including a valve which will direct fluid from said first chamber to one side or the other side of said second piston in said second chamber,
 (2) said valve preventing flow of fluid from either side of said second piston to the other,
(j) means for pressurizing said gas in said hollow piston to a predetermined value.

10. A damper mechanism comprising a cylinder unit, a piston unit mounted for reciprocation therewith, said piston unit comprising a piston rod, said piston rod being hollow, a first piston being mounted at one end of said rod, a second piston being mounted intermediate the ends of said rod, said cylinder unit being formed having a first chamber and a second chamber therein, said first piston being mounted for reciprocation in said first chamber, said second piston being mounted in said second chamber for reciprocation, the end of said rod opposite from said piston extending externally of said cylinder unit, an opening connecting the interior of said hollow rod with said first chamber between said first and second pistons, valved means connecting said first chamber with said second chamber for maintaining fluid in said damper chamber, a free piston mounted for movement in said hollow rod, and means for pressurizing said hollow rod between said free piston and the end of said rod extending externally of said cylinder unit.

11. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including a cooperating first cylindrical chamber and first piston for damping between its cooperating blade and rotor, each connecting means including a cooperating second cylindrical chamber and second piston for positioning between its cooperating blade and rotor, an accumulator, valved means connecting said accumulator to said first cylindrical chamber to maintain operating fluid in said first cylindrical chamber for damping, passage means connecting said accumulator to said second cylindrical chamber for positioning.

12. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including a cooperating first cylindrical chamber and first piston for damping between its cooperating blade and rotor, each connecting means including a cooperating second cylindrical chamber and second piston for positioning between its cooperating blade and rotor, said first cylindrical chamber and second cylindrical chamber being substantially coaxially aligned and fixed relative to each other, an accumulator, valved means connecting said accumulator to said first cylindrical chamber to maintain operating fluid in said first cylindrical chamber for damping, passage means connecting said accumulator to said second cylindrical chamber for positioning.

13. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including a cooperating first cylindrical chamber and first piston for damping between its cooperating blade and rotor, each connecting means including a cooperating second cylindrical chamber and second piston for positioning between its cooperating blade and rotor, said first cylindrical chamber and second cylindrical chamber being substantially coaxially aligned and fixed relative to each other, an accumulator, valved means connecting said accumulator to said first cylindrical chamber to maintain operating fluid in said first cylindrical chamber for damping, passage means connecting said accumulator to said second cylindrical chamber for positioning, a rod extending from said first cylindrical chamber into said second cylindrical chamber, said first piston coacting with said rod in said first cylindrical chamber to impart movement therebetween, said second piston coacting with said rod in said second cylindrical chamber to impart movement therebetween when said second piston is moved by the accumulator to position its cooperating blade relative to the rotor.

14. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including two axially aligned cylindrical chambers fixed relative to each other, a cooperating first piston located in one of said cylindrical chambers for damping between its cooperating blade and rotor, a cooperating second piston located in the other cylindrical chambers for positioning between its cooperating blade and rotor, an accumulator, valved means connecting said accumulator to said first cylindrical chamber to maintain operating fluid in said first cylindrical chamber for damping, passage means connecting said accumulator to said second cylindrical chamber for positioning, a rod extends between said cylindrical chambers so that said first piston and second piston are properly positioned to provide damping and positioning.

15. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including a housing means having a first cylindrical chamber and a second aligned cylindrical chamber, a first piston in said first cylindrical chamber, a second piston in said second cylindrical chamber, an accumulator, valved means connecting said accumulator to said first cylindrical chamber to maintain operating fluid in said first cylindrical chamber for damping, conduit means connecting said accumulator to said second cylindrical chamber for positioning, a first connector fixed to said housing means adjacent said second cylindrical chamber and in alignment therewith, a piston rod fixed to said first piston and extending through the end of said housing means adjacent said first cylindrical chamber, a second connector fixed to the free end of said piston rod, a second rod fixed to said first piston and extending into said second cylindrical chamber, said second piston coacting with the free end of said second rod so that movement thereof by said accumulator will also move said second rod.

16. A damping device for damping motion between two parts having relative movement and positioning said two parts including:
  (a) a cylinder unit,
  (b) a piston unit mounted for reciprocation therewith,
  (c) said cylinder unit comprising:
    (1) a first cylindrical chamber,
    (2) a second cylindrical chamber aligned with said first cylindrical chamber,
    (3) means aligned with said first and second cylindrical chambers for attaching said cylindrical unit to one part,
  (d) said piston unit comprising:
    (1) a first piston in said first cylindrical chamber,
    (2) a second piston in said second cylindrical chamber,
    (3) a piston rod extending from said first piston out of said first cylindrical chamber and externally of said cylinder unit,
    (4) means for attaching said piston rod externally to the second part,
    (5) a second piston rod extending between said cylindrical chambers,
  (e) said first piston being mounted for reciprocation within said first cylindrical chamber,
  (f) said second piston being mounted for reciprocation within said second cylindrical chamber,
  (g) an accumulator,
  (h) valved means connecting said accumulator to said first cylindrical chamber to maintain operating fluid in said first cylindrical chamber for damping,
  (i) passage means connecting said accumulator to said second cylindrical chamber for positioning,
  (j) said second piston coacting with said second piston rod to impart movement to said first piston when said second piston is moved by the accumulator to position one part with respect to the other.

17. In a helicopter, a rotor head, a plurality of blades attached thereto and being permitted limited movement in a lead-lag direction, and means connecting each blade to said rotor to damp movements of each blade in said lead-lag direction when said rotor is operating at its flight speed and to position each blade at a predetermined position when said rotor is below a predetermined speed, each connecting means including a housing having two aligned cylindrical chambers, a first piston in one of said chambers, a second piston in the other of said chambers, said first piston having a piston rod fixed thereto extending out of its chamber externally of said housing, said housing being connected to its cooperating blade, said piston rod being connected to the rotor head, a second rod extending from said one cylindrical chamber into the other between said first and second pistons, said first piston and its cooperating chamber providing for damping between the attached blade and rotor, said second piston and its cooperating chamber providing for positioning between the attached blade and rotor, an accumulator, valved means connecting said accumulator to the cylindrical chamber containing said first piston to maintain operating fluid in said chamber for damping, passage means connecting said accumulator to said cylindrical chamber containing said second piston for positioning, said second rod imparting movement of said second piston to said first piston and piston rod when said second piston is moved by the accumulator to position its cooperating blade relative to the rotor.

References Cited by the Examiner
UNITED STATES PATENTS

| 1,859,584 | 5/32 | Cierva | 170—160.55 |
| 2,604,953 | 7/52 | Campbell | 170—160.55 |
| 3,077,345 | 2/63 | Anderson et al. | 267—64 |

FOREIGN PATENTS

| 787,848 | 12/57 | Great Britain. |

MARK NEWMAN, *Primary Examiner.*
JULIUS E. WEST, *Examiner.*